United States Patent [19]

Tokunaga

[11] 4,359,000
[45] Nov. 16, 1982

[54] RIGHT ANGLE CONVEYOR SYSTEM AND VEHICLE FOR USE THEREIN

[75] Inventor: Kinjiro Tokunaga, Chiba, Japan

[73] Assignee: SI Handling Systems, Inc., Easton, Pa.

[21] Appl. No.: 226,585

[22] Filed: Jan. 21, 1981

[51] Int. Cl.³ .......................................... B61B 13/012
[52] U.S. Cl. ..................................... 104/166; 104/50; 198/472
[58] Field of Search ............... 104/166, 167, 168, 169, 104/170, 172 R, 130, 88, 48, 50; 198/472

[56] References Cited

U.S. PATENT DOCUMENTS

| | | | |
|---|---|---|---|
| 3,118,393 | 1/1964 | Ohlin | 104/166 |
| 3,356,040 | 12/1967 | Fonden | 104/130 |
| 3,738,284 | 6/1973 | Atsuta et al. | 104/50 X |
| 3,845,718 | 11/1974 | Rogers et al. | 104/130 |
| 4,036,148 | 7/1977 | Jones et al. | 104/166 |
| 4,132,174 | 1/1979 | Ziegenfus et al. | 104/48 |
| 4,259,907 | 4/1981 | Schuck | 104/48 |

FOREIGN PATENT DOCUMENTS

| | | | |
|---|---|---|---|
| 2067488 | 7/1981 | United Kingdom | 104/166 |
| 2067489 | 7/1981 | United Kingdom | 104/166 |
| 2068864 | 8/1981 | United Kingdom | 104/166 |

Primary Examiner—Joseph F. Peters, Jr.
Assistant Examiner—M. J. Hill
Attorney, Agent, or Firm—Seidel, Gonda, Goldhammer & Panitch

[57] ABSTRACT

First and second tracks of a conveyor system intersect at right angles. A drive shaft is associated with each set of tracks. Driverless vehicles ride on the tracks and are provided with first and second sets of drive wheels. The sets of drive wheels are used alternatively and each set has an operative position and an inoperative position. A device is provided on the vehicle for moving the first set of drive wheels from a drive position to an accumulation position and thereafter moving the second set of wheels from an accumulation position to a drive position.

8 Claims, 11 Drawing Figures

RIGHT ANGLE CONVEYOR SYSTEM AND VEHICLE FOR USE THEREIN

BACKGROUND

Driverless vehicles which have a drive wheel for contact with a drive shaft and wherein the vehicles can make right angle turns are known. For example, see U.S. Pat. No. 3,356,040. Other known systems utilize rotary turn tables at the corners of the conveyor system so that the vehicles can make a right angle turn. In the above mentioned patent, a portion of the track section is movable in order that the vehicle can make a right angle turn.

The present invention is directed to a solution of a problem wherein vehicles can make right angle turns but the system does not include turn tables, movable track sections, etc.

SUMMARY OF THE INVENTION

The present invention is directed to a right angle conveyor system and to a vehicle for use therein. The vehicle is a driverless vehicle in the form of a square base having support wheels for riding on a track. The base has first and second sets of drive wheels. The first of drive wheels is positioned so that the wheels have simultaneous frictional contact with a drive shaft for driving the base in a first direction. The second set of wheels are positioned for simultaneous frictional contact with another drive shaft for driving the base in a second direction which is perpendicular to the first direction. Each set of drive wheels has operative and inoperative positions. A means is provided on the base for moving the first set of drive wheels from a drive position to an accumulation position and thereafter moving the second set of wheels from an accumulation position to a drive position.

The conveyor system includes first and second tracks which intersect at right angles. A separate drive shaft is associated with each set of tracks. The longitudinal axes of the drive shafts are at right angles. A deceleration cam is associated with the first drive shaft. An acceleration cam is associated with the second drive shaft. The means on the base for moving the sets of drive wheels includes a discrete cam follower for each cam.

It is an object of the present invention to provide a novel driverless vehicle.

It is another object of the present invention to provide a novel right angle conveyor system which does not require turntables, or movable track sections at the location wherein tracks are intersecting one another at right angles.

Other objects and advantages will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION—PRIOR ART

Figure 1:
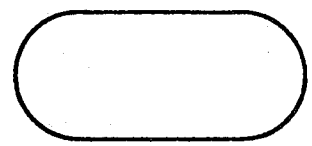
FIGS. 1, 2, 3a and 3b illustrate plan views of conventional endless conveyor systems.
Figure 2:
Figure 3A:
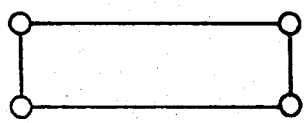
Figure 3B:
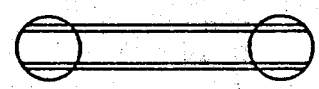

Prior art endless conveyor systems include a loop as shown in FIG. 1, a right angle endless loop as shown in FIG. 2, or a right angle system having turntables at the corners as shown in FIGS. 3a and 3b.

Figure 4:
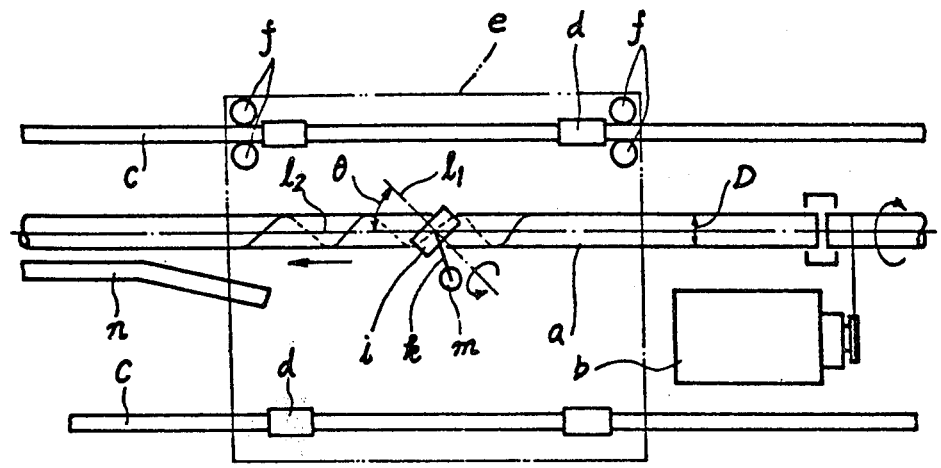
FIG. 4 is a diagrammatic plan view of a conventional system for causing deceleration of a vehicle.
Figure 5:
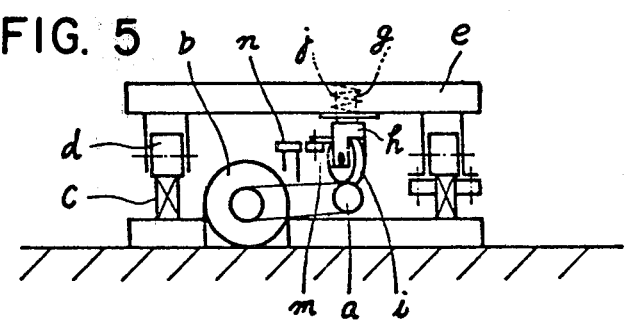
FIG. 5 is a end view of the structure shown in FIG. 4.
Figure 6:
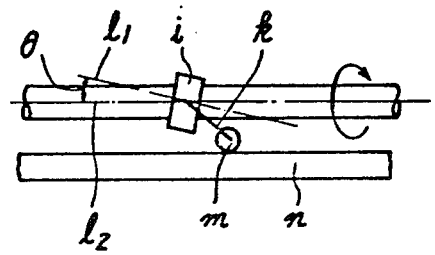
FIG. 6 is an enlarged detailed view of the drive wheel and the cam for causing deceleration.
Figure 7:
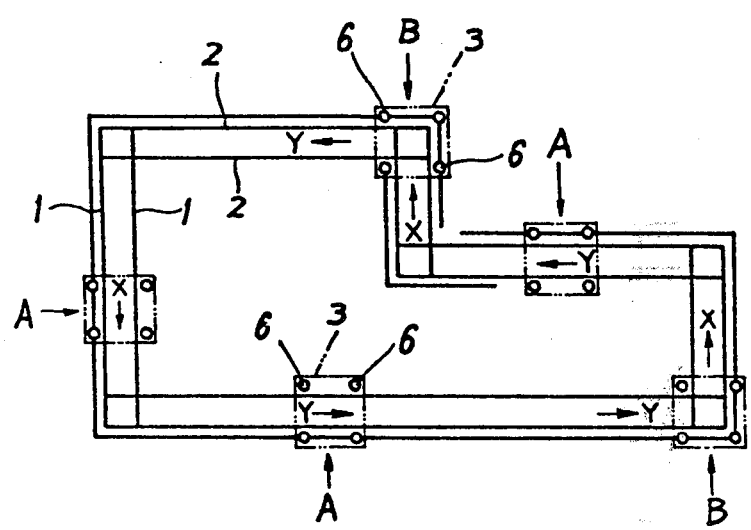
FIG. 7 is a plan view of a right angle conveyor system in accordance with the present invention.

Referring to FIGS. 4–6, a conventional system involves a base (e) having support wheels (d) which ride on rails (c). The base is also provided with guide wheels (f) which cooperate with one of the tracks (c).

The base is provided with a drive wheel (i) mounted on a support (h) so that it may rotate about a horizontal axis ($1_1$). The drive wheel and its support (h) are mounted for rotation about a vertical axis defined by shaft (g). The shaft (g) and the support (h) are spring biassed by a spring (j) to a drive position. As shown in FIG. 4, the drive wheel (i) is in a drive position with its axis of rotation ($1_1$) forming an angle $\theta$ with the longitudinal axis ($1_2$) of the rotating drive shaft (a) having diameter D. Shaft (a) is rotated about its longitudinal axis by motor (b).

The drive wheel (i) may pivot between a drive position as shown in FIG. 4 where the angle $\theta$ is a maximum and an accumulation position wherein the angle $\theta$ is minimal or zero. In order to pivot the drive wheel (i), the support (h) is provided with an arm (k) which terminates in a cam follower (m). A cam (n) is mounted alongside the drive shaft (a) and cooperates with the cam follower (m). See FIG. 6 wherein the angle $\theta$ is substantially less than the angle $\theta$ in FIG. 4. A vehicle as shown in FIGS. 4–6 cannot negotiate right angle turns unless a rotatable turntable is provided at the corners of the system as shown in FIG. 3.

DETAILED DESCRIPTION OF PRESENT INVENTION

The present invention is illustrated in FIGS. 7–10. The conveyor system has right angle turns which can be negotiated by the driverless vehicles. Thus, vehicles A are moving along the conveyor system while vehicles B are negotiating a right angle turn. The vehicles move in either the X or Y directions which are perpendicular to one another.

The vehicles A and B are defined by a base 3 which is square in plan view. The base 3 is provided with swivel support wheels 4 which ride on tracks 1 and 2. The tracks 1 and 2 have their adjacent ends interconnected by a rectangular track section designated 5.

Alongside the outer perimeter of the conveyor system, there is provided the track guide 9 having interconnecting portions 7 and 8. Each corner of the base 3 is provided with a guide wheel 6. When the vehicle is moving in the direction X along the track 1, two of the guide wheels 6 are guided by the track portions 7. See FIG. 8. When the vehicle is moving in the direction Y, two of the guide wheels 6 are guided by the portion 8. See FIG. 10.

A drive shaft 10 is provided between the tracks 1. A drive shaft 11 is provided between the tracks 2. The longitudinal axes of the drive shafts 10 and 11 are mutually perpendicular. The drive shafts 10 and 11 have extensions disposed within the square track section 5. The base 3 has a first set of cooperating drive wheels 14 which have frictional contact with the drive shaft 10 when the vehicle is moving in the direction X. The base 3 has a second set of drive wheels 15 which have frictional contact with the drive shaft 11 when the vehicle is moving in the direction Y.

Each drive wheel has a support 13 connected to the base 3 of the vehicle for pivotable movement about a vertical axis 12. Each drive wheel is biassed to a drive position in the manner as described above in connection with the prior art. The supports 13 for the drive wheels 14 have integral outwardly extending arms 22. Each arm 22 is pivotably connected to one end of a connecting rod 16. The other end of each connecting rod 16 is pivotably connected to a discrete one of the arms on the hub 19. Hub 19 is supported by the base of the vehicle for pivotable movement about a vertical axis at the center of the base.

The supports for the drive wheels 15 each have an outwardly extending arm 22. Each of the arms 22 is pivotably connected to one end of a connected to one end of a connecting rod 17. The other end of each connecting rod 17 is connected to a discrete arm on the hub 19. One of the supports 13 for the drive wheels 14 has an arm 18 terminating in a cam follower 20. Cam follower 20 is adapted to cooperate with a deceleration cam 23 disposed within the square track section 5. One of the supports 13 for the drive wheels 15 is provided with a similar arm 18 terminating in a cam follower 21. Cam follower 21 is adapted to cooperate with an acceleration cam 24 within the square track section 5. Adjacent each corner, and properly positioned, there is provided a gap 25 in each of the guide track sections 7 and 8.

Figure 8:
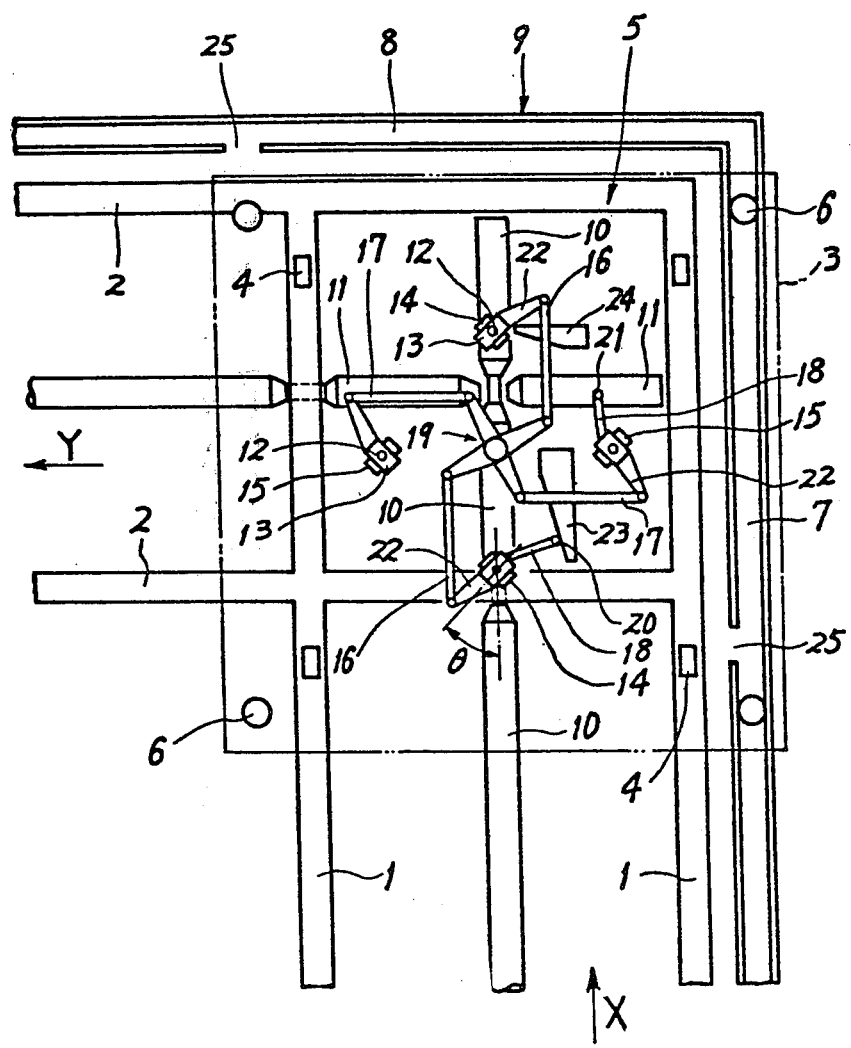
FIGS. 8-10 are enlarged sequential detailed views showing the sequence of a vehicle negotiating a right angle turn in accordance with the present invention.
Figure 9:
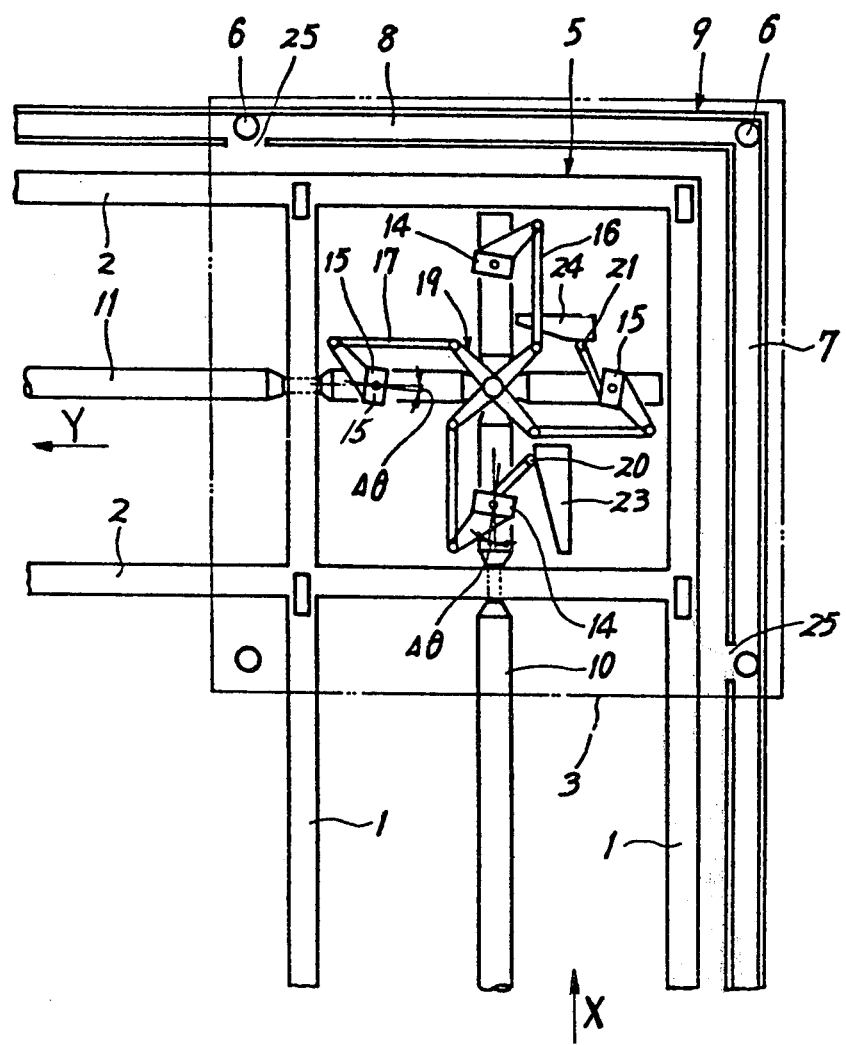
Figure 10:
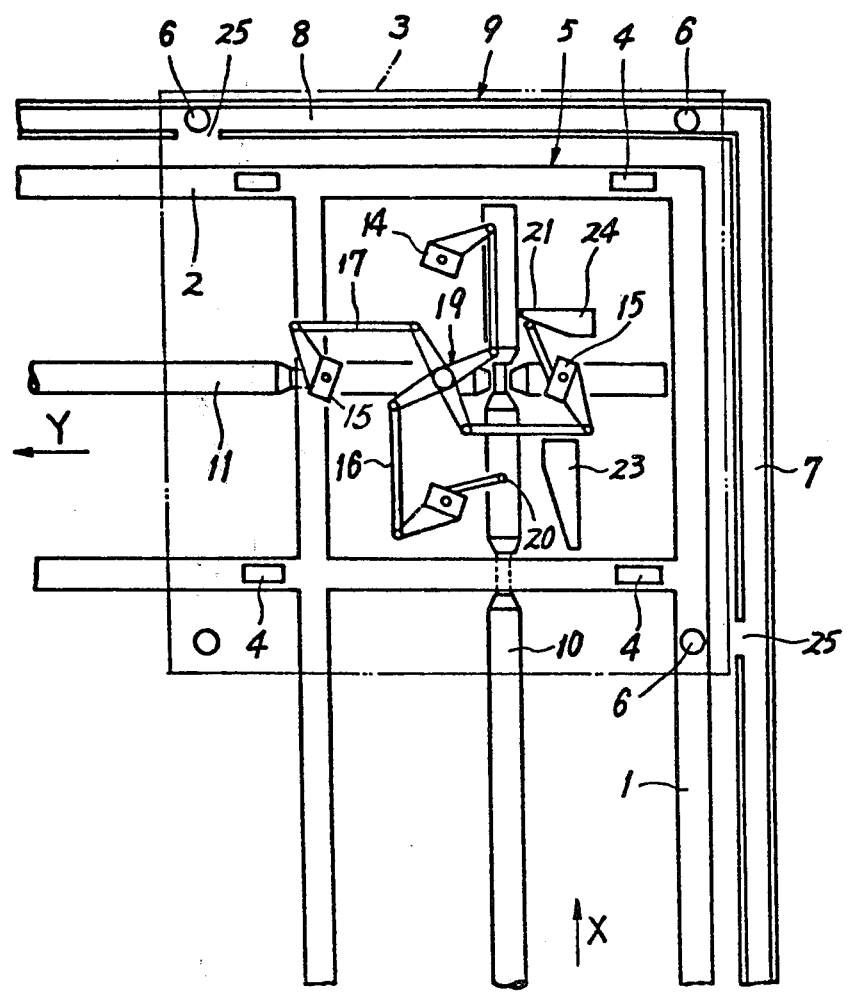

The driverless vehicles traverse the right angle section of the conveyor system in the sequence of steps as shown in FIGS. 8–10. The vehicle was propelled in the direction X to the position shown in FIG. 8 by frictional contact between drive wheels 14 and the drive shaft 10. Due to contact between the cam follower 20 and cam 23, the drive wheels 14 are pivoted to an accumulation position wherein angle $\theta$ is almost zero as shown in FIG. 9. Simultaneously, cam follower 21 contacts cam 24 and drive wheels 15 are now above and in frictional contact with the drive shaft 11. Angle $\theta$ for the drive wheels 15 is the same as the angle $\theta$ for the drive wheels 14. At this point in time all drive wheels are in their accumulation position. The guide wheels 6 at the front of the vehicle are now aligned with track portion 8. Also, one of the drive wheels 6 at the rear of the vehicle 3 is aligned with the gap 25 in the track portion 7. See FIG. 9. The vehicle creeps from right to left and gradually accelerates as drive wheels 15 move toward their drive position. See FIG. 10. As shown in FIG. 10, the drive wheels 14 have moved out of contact with the drive shaft 10 and the vehicle is now being propelled in the direction Y by the drive shaft 11. In order for the vehicle to traverse the right angle turn in the track section, it was not necessary to move any of the track portions and turntables are not required. Further, the endless conveyor system can have right angle turns to the left and to the right.

The present invention may be embodied in other specific forms without departing from the spirit or essential attributes thereof and, accordingly, reference should be made to the appended claims, rather than to the foregoing specification, as indicating the scope of the invention.

I claim:

1. A driverless vehicle for use in a right angle conveyor system comprising a square base having support wheels for riding on tracks, said base having first and second sets of drive wheels, said first set of drive wheels being positioned for simultaneous frictional contact with a drive shaft for driving the base in a first direction, said second set of drive wheels being positioned for simultaneous frictional contact with a drive shaft for driving the base in a second direction which is perpendicular to said first direction, each set of drive wheels having drive and accumulation positions, and means on the base for moving the first set of drive wheels from a drive position to an accumulation position and thereafter move the second set of wheels from an accumulation position to an drive position.

2. A vehicle in accordance with claim 1 including a hub pivotably supported in the center of the base and having four arms, each arm of said hub being connected to a discrete one of said drive wheels.

3. A vehicle in accordance with claim 1 wherein said last mentioned means includes a discrete cam follower associated with each set of drive wheels.

4. A vehicle in accordance with claim 1 including a guide wheel on the base adjacent each corner of the base.

5. A right angle conveyor system comprising first and second sets of tracks intersecting at right angles, a drive shaft associated with each set of tracks, the longitudinal axes of said shafts being at right angles, a deceleration cam associated with the first drive shaft, an acceleration cam associated with the second drive shaft, at least one driverless vehicle supported by one of said sets of tracks, said driverless vehicle having a square base, said base having first and second sets of drive wheels, said first set of drive wheels being positioned for simultaneous frictional contact with one of said drive shafts, the other set of drive wheels being positioned for simultaneous frictional contact with the other drive shaft, and means on the base for cooperation with said cams for moving the sets of drive wheels between drive and accumulation positions.

6. A system in accordance with claim 5 wherein there is provided at least one right angle turn to the left and at least one right angle turn to the right.

7. A system in accordance with claim 5 wherein said vehicle is supported on said one set of tracks by swivel support wheels which can ride on each set of tracks.

8. A vehicle in accordance with claim 1 wherein said support wheels are four swivel wheels adapted to ride on mutually perpendicular tracks.

* * * * *